United States Patent [19]

Amano et al.

[11] Patent Number: 4,601,648
[45] Date of Patent: Jul. 22, 1986

[54] MOLD CLAMP MECHANISM FOR TIRE PRESS

[75] Inventors: Itaru Amano; Masanobu Kurumaji; Shikao Misumi, all of Kobe; Yasuhiko Fujieda, Akashi; Masahide Kanzawa, Kobe, all of Japan

[73] Assignee: Kabushiki Kaisha Kobe Seiko Sho, Kobe, Japan

[21] Appl. No.: 773,549

[22] Filed: Sep. 9, 1985

[51] Int. Cl.[4] .............................................. B29H 5/02
[52] U.S. Cl. ........................................ 425/47; 425/33; 425/451.9
[58] Field of Search .................. 425/17, 19, 47, 450.1, 425/451.9

[56] References Cited

U.S. PATENT DOCUMENTS

| 2,916,768 | 12/1959 | Quéré et al. | 425/451.9 |
| 2,923,527 | 2/1960 | Fannen | 425/19 X |
| 3,137,032 | 6/1964 | MacMillan | 425/19 |
| 3,233,284 | 2/1966 | MacMillan | 425/19 |
| 3,336,636 | 8/1967 | Soderquist | 425/33 |
| 3,741,696 | 6/1973 | Greenwood | 425/47 |

FOREIGN PATENT DOCUMENTS 57-167237 10/1982 Japan ........................ 425/47

Primary Examiner—J. Howard Flint, Jr.
Attorney, Agent, or Firm—Oblon, Fisher, Spivak, McClelland & Maier

[57] ABSTRACT

A mold clamp mechanism for a tire press with upper and lower molds, the clamp mechanism including a plurality of rod locking holes formed around the press center of the upper and/or lower mold; a corresponding plurality of clamp rods vertically received in rod receptacle holes in a fixed mold support structure, each clamp rod having a T-shaped head portion protrudable into a locking hole in the mold and lockable therein when the clamp rod is turned a 90 degree angle; a drive cylinder having rod operating arms connected to the piston rod thereof for movements toward and away from the clamp rod; rod rotating members mounted on the clamp rod and on one of the rod operating arms and engageable with each other when the piston rod is advanced toward the clamp rod to turn the same a 90 degree angle; and rod pull members mounted on the clamp rod and the rod operating arms and engageable with each other when the piston rod is further advanced toward the clamp rod after a 90 degree angle of rotation so as to clamp the mold to the fixed mold support structure.

7 Claims, 16 Drawing Figures

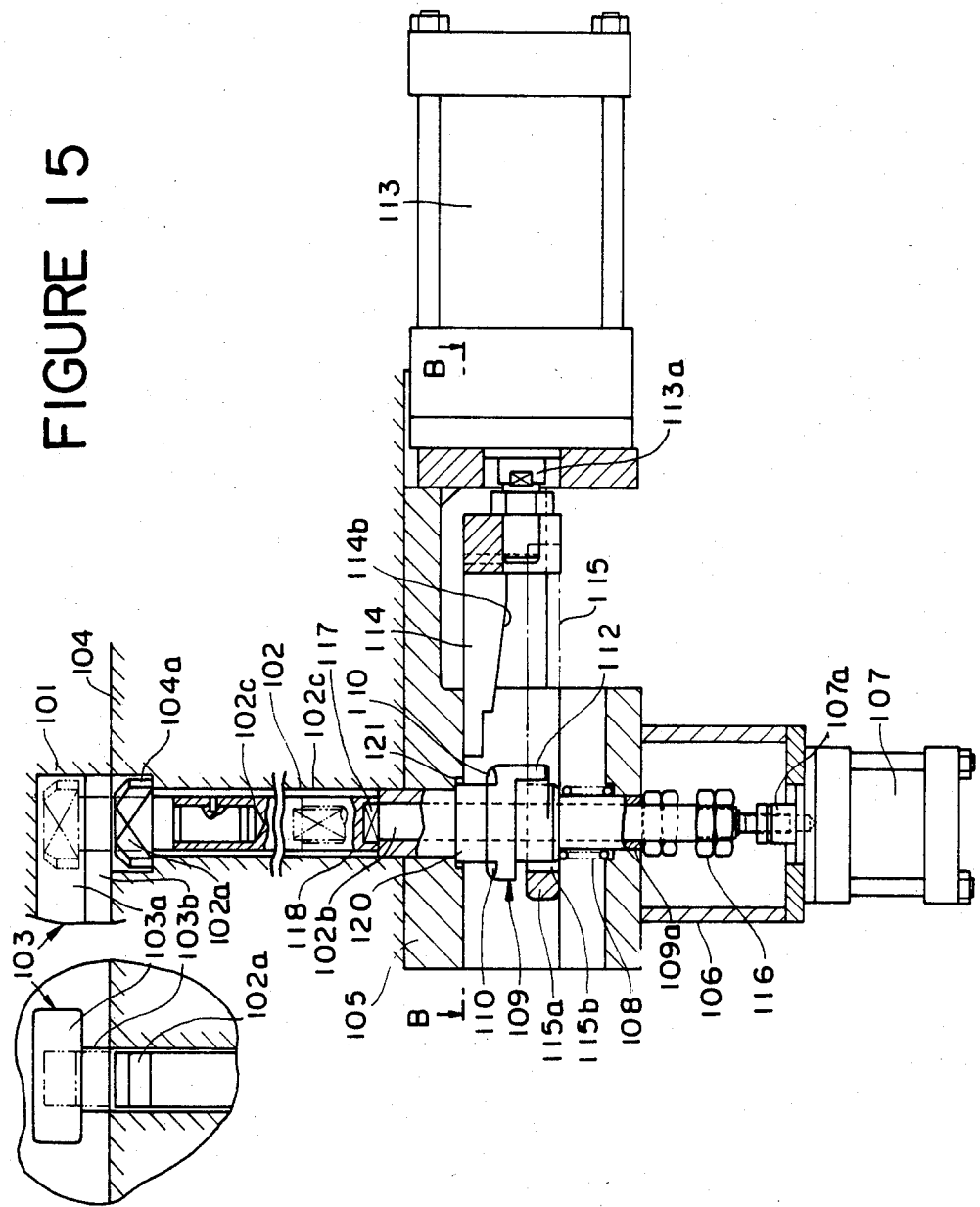

MOLD CLAMP MECHANISM FOR TIRE PRESS

BACKGROUND OF THE INVENTION

1. Field of the Invention

This invention relates to a mold clamp mechanism for tire press, which is simplified in construction and operation and which can clamp molds promptly in a facilitated manner to ensure high efficiency.

2. Description of the Prior Art

A tire press is usually provided with upper and lower molds which are movable toward and away from each other, a dome which circumvents the upper and lower molds and a shaping center mechanism, and is supplied with steam or other pressurized heat medium for shaping and curing tires. In the shaping and curing operation, the upper and lower molds have to be securely clamped in a closed state against the pressurized medium which is supplied through a bladder of the center mechanism. In this regard, it has been the conventional practice to fix the lower mold on the base of a curing machine through a heat insulator and a lower platen (internally heated) by bolt clamp means which engages peripheral edge portions of the mold, while fixing the upper mold by similar bolt clamp means on an upper platen which is retained on part of the top platen. However, such bolt clamp means requires time for mold replacements and creates extremely bad working conditions for workers since the molds have to be replaced while they are still very hot. In addition, the job of fastening large bolts involves relatively heavy labor, resulting in a longer press cycle and lower productivity. Especially in the case of a press of the type in which the outer peripheries of the molds are covered by a dome, the space around the outer peripheries of the molds is extremely limited and therefore installation and operation of such bolt clamp means usually give rise to various difficulties. In place of the manual clamp means, the applicant proposed an automatic clamp means in Laid-Open Japanese Patent Application No. 57-167237, for clamping the lower mold of the mold set on a tire press. More particularly, the lower mold in the prior application is provided with a plurality of engaging portions in its outer peripheral portions, and clamp rods with engaging portions for releasably clamping the lower mold in position are movable up and down in the axial direction by means of a lift drive (i.e., a fluid cylinder) and at the same time rotatable about their axes by means of a rotational drive (i.e., a fluid cylinder). The clamp rods are driven into clamping and releasing positions by forward and reverse rotations of the rotational drive to couple and uncouple the engaging portions, and at the same time are driven up and down by the lift drive to clamp the lower mold to the base of the tire press. This automatic clamp mechanism requires the formation of recessed engaging portions in the outer peripheral portions of the lower mold and the employment of a couple of fluid cylinders for the lifting and rotating movements. The mold structure with a plurality of recessed or notched engaging portions around its marginal edge involves problems with regard to the mold strength. On the other hand, the provision of a couple of fluid cylinders for each clamp rod results in complication in construction and maintenance in addition to an increase in size. Such further involves problems in that the clamp is loosened immediately and the lower mold floats up if the fluid pressure in the drive cylinder drops, and in that it is difficult to mount the cylinders in narrow limited spaces around the molds or in a lower portion of the press. A difficulty is also encountered in operating the two cylinders in an appropriately timed manner.

SUMMARY OF THE INVENTION

It is an object of the present invention to provide a mold clamp mechanism which overcomes the above-mentioned problems or drawbacks of the conventional automatic clamp mechanism.

It is a more particular object of the present invention to provide a mold clamp mechanism of the clamp rod type, which is arranged to rotate and pull a clamp rod simultaneously by a single fluid cylinder to thereby engage and release the clamp rod and to apply clamp efficiently on either the upper or lower mold.

It is a further object of the present invention to provide a mold clamp mechanism in which the head portion of the clamp rod is fully retractable into a recess formed on a mold mounting surface to prevent damage to the head portion of the clamp rod and facilitate mold replacement.

According to the present invention, there is provided a mold clamp mechanism for a tire press with upper and lower molds, the clamp mechanism essentially comprising in combination a plurality of rod locking holes formed around the press center of the upper and/or lower mold; a corresponding number of clamp rods vertically movably passed through a fixed mold support structure, each clamp rod having a T-shaped head portion protrudable into a locking hole in the mold and lockable therein when the clamp rod is turned 90 degrees; a rod operating cylinder having rod operating arms attached to the fore end of its piston rod for movements toward and away from the clamp rod; rod rotating members mounted on the clamp rod and on one of the rod operating arms and engageable with each other when the piston rod is advanced toward the clamp rod so as to turn the same 90 degrees; and rod pulling members mounted on the clamp rod and the rod operating arms and engageable with each other when the piston rod is further advanced toward the clamp rod after a 90 degree rotation to clamp the mold to the fixed mold support structure.

The above and other objects, features and advantages of the invention will become apparent from the following description and the appended claims, taken in conjunction with the accompanying drawings which show by way of example preferred embodiments of the invention.

BRIEF DESCRIPTION OF THE DRAWINGS

In the accompanying drawings:

FIG. 15 is a partly sectioned front view of another embodiment of the invention.

DESCRIPTION OF PREFERRED EMBODIMENTS

Figure 1:
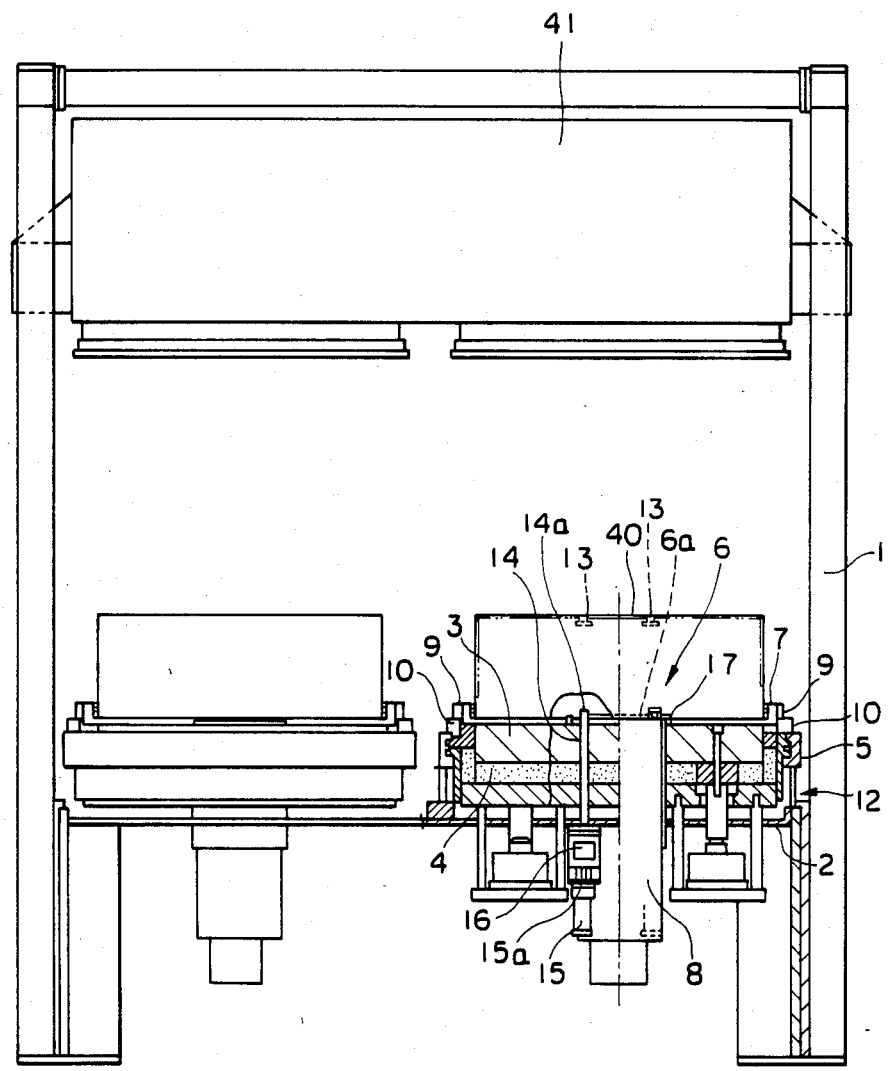
FIG. 1 is a partly sectioned front view of a tire press incorporating a clamp mechanism according to the invention.
Figure 2:
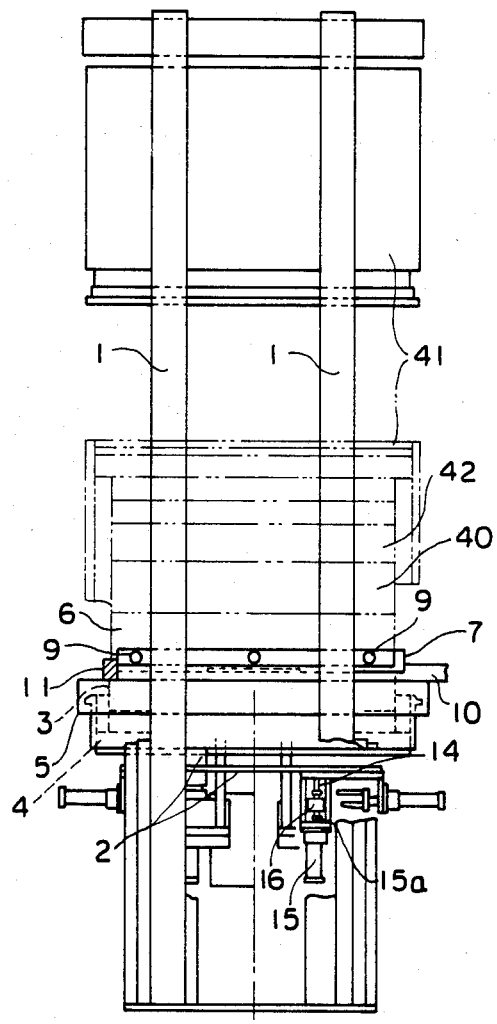
FIG. 2 is a side view of the tire press.
Figure 3:
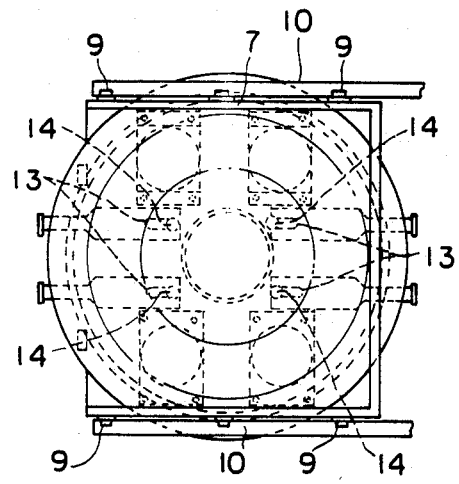
FIG. 3 is a plan view of the tire press.

Hereafter, the invention is described more particularly by way of the preferred embodiment shown in the drawings. Referring to FIGS. 1 to 3, there is illustrated a mold clamp mechanism of present invention as applied to a tire press of the type in which the upper and lower molds are opened and closed by vertical movements and clamped by a breach lock using clamp rings. In this connection, it is to be understood that the present invention is in no way limited by the type of tire press utilized and is applicable to all of tire presses in which the upper and lower molds are movable relative to each other for opening and closing the same and are mounted on upper and lower platens each with an internal heating source.

A lower platen 3 (with an internal heat source) is fixedly retained on a base 2 of a press frame 1 through a heat insulating material 4. Reference numeral 5 denotes a clamp ring. As is well known in the art, a lower mold 6 is delivered and set on the lower platen 3 by a loading means such as crane, fork lift or the like. In the particular embodiment shown, loading by a carriage 7 is exemplified. Namely, the carriage 7 which supports the lower mold 6 is notched to preclude its interference with a center mechanism 8 which is mounted on the base 2 concentrically with the axis of the press, the mold being carried onto the platen 3 from a position outside the tire press by the wheels 9 of the carriage 7 and along guide rails 10 which are inserted onto the base 2. The mold 6 is set in position correctly relative to the platen 3 when one end of the carriage 7 is abutted against a stopper 11 on the clamp ring 5 as shown particularly in FIG. 2. Since the clamp ring 5 is arranged to move upon application of a mold clamping force in a manner known in the art, a support 12 is erected on the base 2 in contact with the lower side of the clamp ring 5, thereby preventing lowering of the mold position by the weight of the lower mold 6 and guide rails 10. Therefore, in the embodiment shown, for loading and setting the mold 6 in position, the guide rails 10 are inserted from the exterior up to a predetermined position, and then the carriage 7 with the mold 6 thereon is moved onto the rails 10 manually or by suitable means. As soon as the head end of the carriage 7 is abutted against the stopper 11, the mold 6 is loaded on the lower platen in a correctly superposed state, and after loading, the carriage 7 is retracted, placing the mold 6 so as to be directly superposed on the lower platen 3 in a predetermined posture. After this, the mold 6 is clamped so as to fasten it to the platen 3. To this end, the present invention employs, as major components of the mold clamp mechanism, rod locking holes 13 formed on the bottom surface of the mold 6 and clamp rods 14 which are releasably engageable in the rod locking holes 13. That is to say, the rod locking holes 13 are provided at an arbitrary number of positions on the bottom surface of the mold 6 symmetrically around the press center, for example, at four positions as seen in FIG. 2, and four clamp rods 14 are extended through the base 2, heat insulating material 4 and platen 3 so as to be slidable in the axial direction and rotatable about their respective axes. The lower end of each clamp rod 14 is connected through a coupling member 16 to a piston rod 15a of a drive cylinder 15 which is actuatable to lift the rod up and down.

Figure 4:
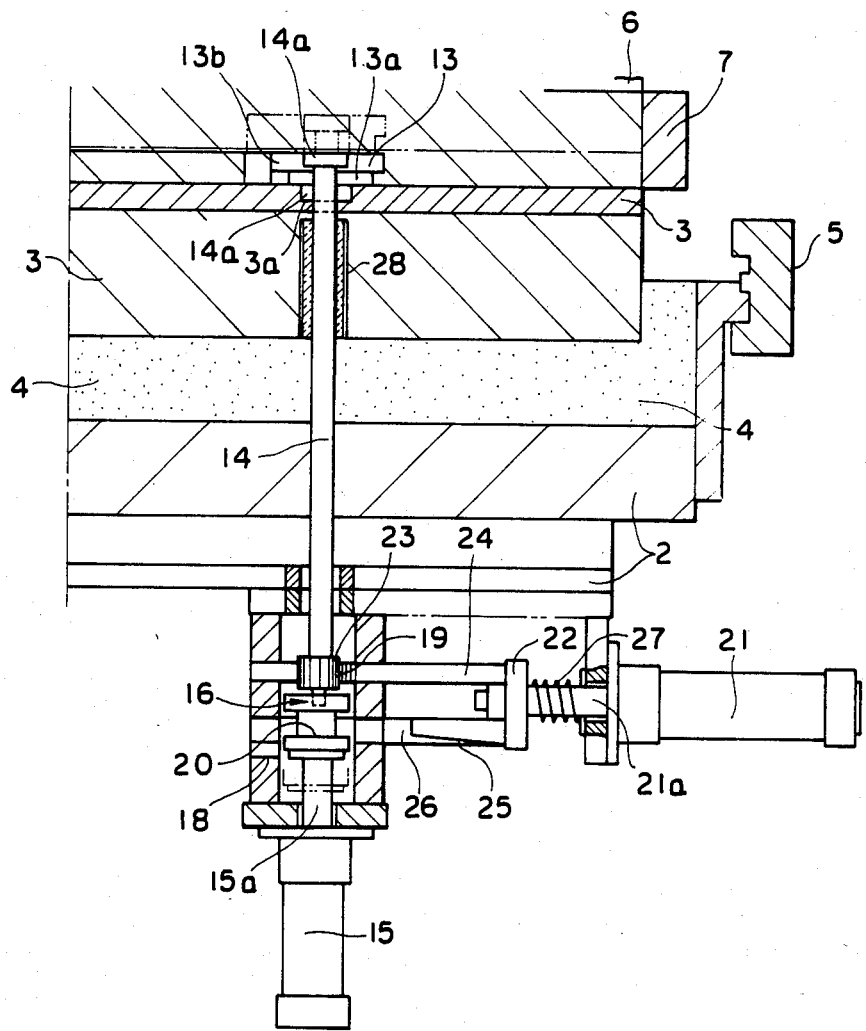
FIG. 4 is a partly sectioned front view of the clamp mechanism.
Figure 5:
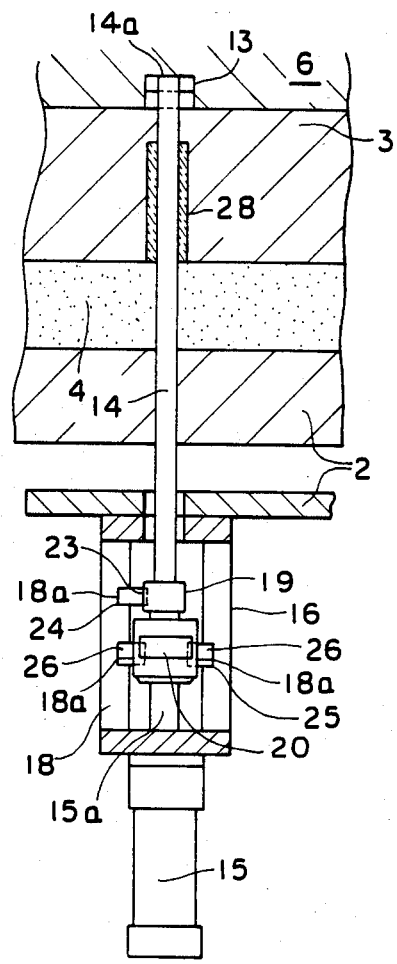
FIG. 5 is a partly sectioned side view of the clamp mechanism.
Figure 7:
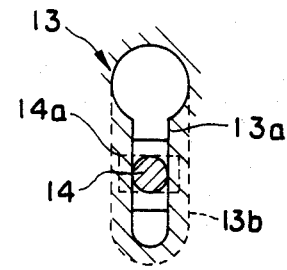
FIG. 7 is a plan view of a rod receptacle groove.

Reference is now had to FIGS. 4 through 8 to explain in greater detail the clamp mechanism of the invention including the rod locking holes 13 and clamp rods 14. The rod locking holes 13 which are formed upwardly into the bottom surface of the mold 6, in the fashion of blind holes, are each provided with an entrance groove 13a of a narrow width opening on the bottom surface and a locking groove 13b formed contiguously above the entrance groove 13a in a stepwise broadened width as shown in FIGS. 4, 5 and 7. On the other hand, each clamp rod 14 is provided with a T-shaped head portion 14a at the upper end thereof. The head portion 14a has a width smaller than that of the entrance groove 13a, and has a length large enough for stopping the same in the locking groove 13b in a bridged manner. Accordingly, as shown in FIG. 7, the head portion 14a which is disposed in parallel relation with the entrance groove 13a is lifted up therethrough, and is easily inserted into the upper locking groove 13b past the lower entrance groove 13a, and is interlocked with the locking groove 13b after a 90 degree rotation in the locking groove 13b. The rod 14 is connected to the piston rod 15a of the drive cylinder 15 through the coupling member 16, so that if the clamp rod 14 is lifted up after inserting the head portion 14a in the locking groove 13b in contact with the tip surface of the groove 13b, the mold 6 is moved up and down together with the rod 14 in the vertical direction. Therefore, as the mold 6 is delivered and set on the platen 3 by the carriage 7 and directly superposed on the platen 3 by retraction of the carriage 7 as described hereinbefore with reference to FIGS. 1 to 3, the clamp rod 14 in its lowermost position is via head portion 14a received in a receptacle hole 3a, which is formed on the top surface of the platen 3 in alignment with the rod receptacle hole 13 as shown in FIG. 4, and is lifted up by the drive cylinder 15 and piston rod 15a (with the head portion 14a disposed parallel with the pass groove 13a), thus protruding the head portion 14a into the stopper locking groove 13b through the entrance groove 13a. The head portion 14a is abutted and pushed up against the top surface of the locking groove 13b as shown in FIGS. 4 and 5 to lift the mold 6 over the carriage 7 (by about 3-5 mm). After retracting the carriage 7 to a position outside the press, the clamp rod 14 is lowered by the drive cylinder 15 and the piston rod 15a to superpose the mold 6 directly on the platen 3. In the case where a register ring 17 is provided on the side of the platen 3, the press center on the bottom surface of the mold 6 can be registered with a concentric registering hole 6a as shown in FIG. 1 when the mold 6 is lowered into contact with the platen 3.

Figure 6:
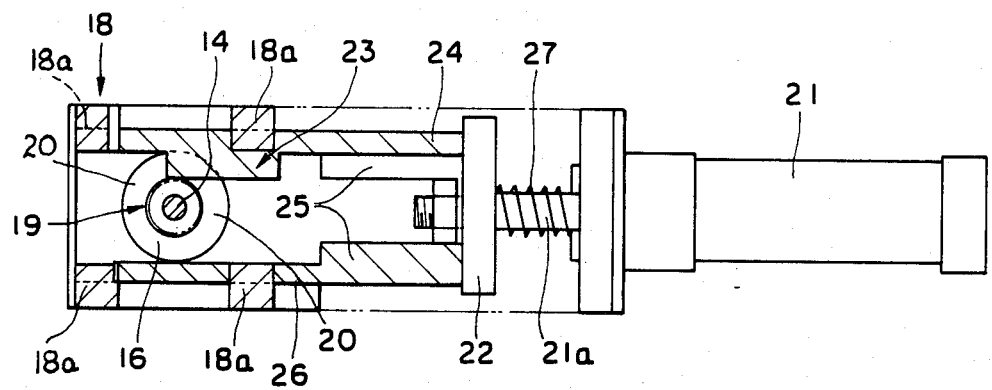
FIG. 6 is a partly sectioned plan view of the rotating and clamping mechanisms.
Figure 9:
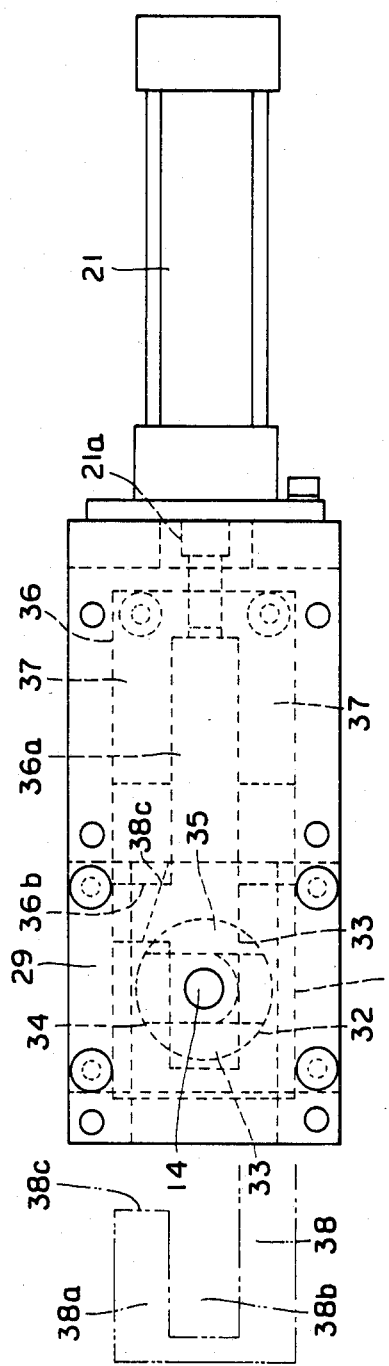
FIG. 9 is a plan view of a clamp mechanism of a modified construction.
Figure 10:
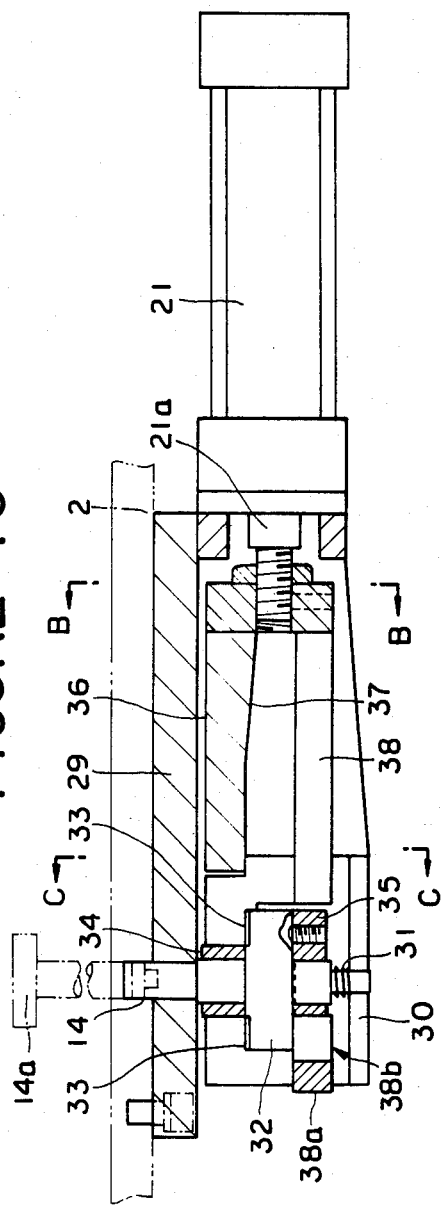
FIG. 10 is a partly sectioned side view of the modified clamp mechanism.
Figure 11:
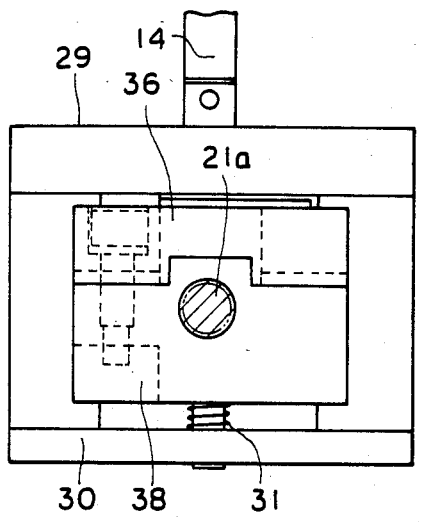
FIG. 11 is a sectional view taken on line B—B of FIG. 10.
Figure 12:
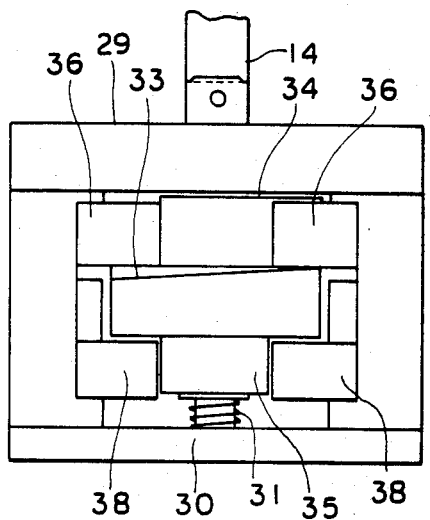
FIG. 12 is a sectional view taken on line C—C of FIG. 10.

According to the present invention, on a frame 16 which fixedly mounts the drive cylinder 15 on the base 2, a pinion 19 is fixedly mounted on the circumference of the clamp rod 14 at a position above the coupling member 16 which is provided with tapered grooves 20. The pinion 19 serves to turn the clamp rod 14 through a 90 degree angle about its axis, while the tapered grooves 20 serve to pull the mold 6 toward the platen 3, that is to say, to clamp the mold. For driving these members, a reciprocal drive cylinder 21 is employed in the particular embodiment shown, as exemplified in FIGS. 4 and 6. A mounting plate 22 is fixed at the fore end of the piston rod 21a of the cylinder 21, and, as shown in FIGS. 4 to 6, a rack bar or rod operating arms 24 with a rack 23 for meshing engagement with the pinion 19 on the clamp rod 14 is provided in an upper portion of the plate 22 in a direction perpendicular to the rod 14. Provided in a lower portion of the plate 22 is a taper bar 26 which is extended parallel with the rack bar 24 and provided with tapered projections 25, which are engageable with the tapered grooves 20 on the coupling member 16 of the rod 14 to pull down the latter. In this regard, it suffices to provide a single rack bar 24 for engaging the pinion 19 and rack 23 with each other in the manner as illustrated in FIGS. 5 and 6. The taper bar 26 has a couple of parallel taper bars 26 which extend out at the same level, namely, in a bifurcated fashion for engagement with a pair of tapered grooves 20 which are formed at the opposite sides of the coupling member 16 as shown particularly in FIGS. 5 and 6. This arrangement serves to further strengthen the wedge-like pressing engagement of the tapered grooves 20 with the tapered surfaces of the taper projections 25. These bars 24 and 26 slide under guidance of guide grooves 18a on the frame 18 to make sure their back and forth movements are properly accomplished. In the embodiment shown, a cushion spring 27 is mounted on the piston rod 21a of the drive cylinder 21. In FIGS. 4 and 5, indicated at 28 is heat insulating material covering the clamp rod 14 which slides in the platen 3.

Figure 8:
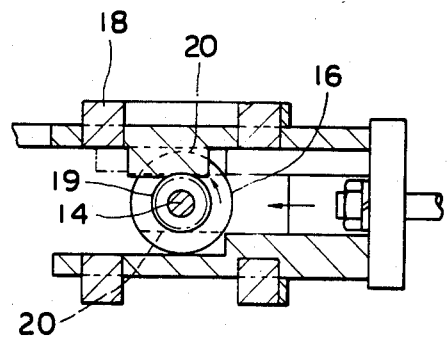
FIG. 8 is an illustration explanatory of the motion of the rotating and clamping mechanisms.

With the clamp mechanism of the invention shown in FIGS. 4 through 8, the lower mold 6 is mounted on and clamped to the lower platen 3 in the following manner. In the first place, the clamp rods 14 are moved upward by the respective clamp cylinders 15 to protrude the head portions 14a into the locking grooves 13b of the mold 6, pushing up the mold 6 by contact with the top surfaces of the rod receptacle holes 13. When the clamp rods 14 are lowered to superpose the mold 6 directly on the platen 3 after retraction of the carriage 7, the head portions 14a are held in contact with the top surfaces of the locking grooves 13b, Therefore, upon advancing the piston rod of the laterally located drive cylinder 21 from right to left in FIGS. 4 and 6, the rack bar 24 and taper bar 26 which are integrally connected to the piston rod 21a are moved forward with the latter. In this instance, the rack 23 of the rack bar 24 which is positioned forward of the tapered projection 25 of the taper bar 26 as is clear from a review of FIG. 6 is moved forward into meshing engagement with the pinion 19 of the rod 14. Accordingly, the rod 14 is firstly rotated about its axis, turning the head portion 14a of the rod 14 through a 90 degree angle in the locking groove 13b to engage the same with the groove 14b. FIG. 8 illustrates this rotation of the pinion 19 by the rack 23. As the piston rod 21 is moved forward continuously, the tapered projections 25 of the taper bar 26, which are located behind the rack 23 of the rack bar 24, are then moved onto the tapered grooves 20 on the coupling member 16. As a result of the forward movement of the tapered projections 25 in engagement with the tapered grooves 20, the propelling fluid pressure of the drive cylinder 21 is converted to a magnified downward force by the overriding engagement of the tapered surfaces of the projections 25 of the taper bar 26 with the tapered grooves 20, pushing down the rod 14 to thereby clamp the mold 6 integrally to the platen 3. At this time, the tapered grooves 20 is moved from the position of FIG. 6 to the position of FIG. 8 by the 90 degree angle of rotation of the rod 14, so that the tapered projections 25 are permitted to protrude thereinto easily to push down the rod 14 securely with a strong force.

In a case where the taper angle is minimized, namely, when $\tan \alpha < \mu$ (the coefficient of friction between the tapered groove 20 and tapered projection 25), the clamp force on the mold 6 can be maintained by elastic deformation of the clamp rod 14 itself even if the fluid pressure of the drive cylinder 21 is depressurized to a zero level, that is to say, by the self-blocking effect. Such self-blocking effect becomes more reliable when a spring 27 is provided as in the particular embodiment shown. The mold clamp is released by retracting the piston rod 21a of the drive cylinder 21. With the mold clamp mechanism of the present invention, clamping of the mold 6 to the platen 3 is attained automatically in a facilitated and prompt manner by the combination of the rack bar 24 and tapered bar 26 which are operated by a single drive cylinder, the pinion 19 and tapered grooves 20 which are provided on the clamp rod 14, and the rod receptacle hole 13 formed in the bottom surface of the mold 6 and the head portion 14a of the clamp rod 14. In this instance, if the rod receptacle holes in the bottom surface of the mold 6 is located at predetermined positions from the press center irrespective of the mold size, the clamp mechanism can be applied to molds of various sizes. This is extremely advantageous at the time of mold replacement. The conventional mold clamp mechanism, including the prior art cited hereinbefore, are invariably arranged to clamp a mold by bolts or other means which are engageable in clamp grooves or notches provided on outer lateral sides of a platen. Since platens on a tire press contain a heat source, and the provision of large clamp grooves or notches will invite a large amount of heat dissipation and degradation in strength. These drawbacks of the conventional mechanisms are overcome in the present invention byy the provision of the rod receptacle holes 13 in the bottom surface of the mold. In addition, since the mold clamp can be attained by the use of a single drive cylinder, the present invention is more compact in construction and permits easier maintenance and service and assembly of the tire press, as compared with the conventional mechanisms employing a couple of drive cylinders for rotation and lift of a clamp rod.

In the foregoing embodiment in which the carriage 7 is used for loading and setting a mold 6 in position, it is necessary to provide a rod lifting drive cylinder 15 in addition to the mold clamping drive cylinder 21. In a case where the mold is loaded and set by other means or in a case where the retraction of the carriage 7 is attained by other means, it suffices to provide the drive cylinder 21 alone since there is no need for lifting the mold 6 up and down on the platen 3 by the clamp rod 14. Further, it is possible to add alterations in design to the mechanism which is shown in FIGS. 4 to 8 as means for rotating the clamp rod 14 through a 90 degree angle and pulling the same down. For example, a modified mechanism is shown in FIGS. 9 to 12, in which the lower end of the clamp rod 14 is supported through a spring 31 on a seat 30 of a mounting frame 29 on the side of the base 2 so as to be slidable in the axial direction and rotatable about the axis thereof. Although omitted from illustration, the rod 14 which is passed through the base 2, insulating material 4 and platen 3 is releasably lockable in the rod receptacle hole 13 at the bottom of a lower mold 6 by rotation through a 90 degree angle of its head portion 14a in the same manner as described hereinbefore. A disk 32 which is securley fixed at the lower end of the rod 14 is provided with tapered portions 33 on its upper surface on the radially opposite sides of the rod 14. A cam 34 is projected from the circumference of the rod 14 in the same direction as the tapered portions 33 in an upper portion of the disk 32, and a cam 35 is similarly projected from the rod circumference in a 90 degree shifted position relative to the cam 34 on the freely rotatable disk 32. On the other hand, a substantially U-shaped rod rotating/pulling bar 36 is mounted at the fore end of the position rod 21a at the same level with the cam 34, the lever 36 being centrally provided with a notch 36a which is slidably engageable with the cam 34. In rear portions of its bottom surface, the bar 36 is formed with tapered portions 37 opposed to the tapered portions 33 on the upper surface of the disk 32. Further, a substantially L-shaped return bar 38 which is longer than the bar 36 is fixed to the fore end of the rod 21a in a lower portion of the disk 32 at the same level with the cam 35 which is provided on the circumference of the rod, in parallel relation with and at a lower position than the bar 36. The L-shaped head portion 38a of the return bar 38 is provided with a notch 38b for engagement with the cam 35. According to this mechanism, the clamp rod 14 is in released state in the position of FIGS. 9 and 10, and the head portion 14a of the rod 14 is disposed parallel with the rod receptacle hole 13 at the bottom of the mold 6. In this state, the piston rod 21a of the drive cylinder 21 is in its retracted position, the upwardly located rod rotating/pulling bar 36 is retracted from the cam 34, and the notch 38b in the L-shaped head portion of the return bar 38 is maintained in a released state in engagement with the cam 35.

In order to clamp the mold 6, the piston rod 21a of the drive cylinder 21 is advanced leftward from the position shown in the drawing, whereupon the return bar 38 at a lower level is moved to a foremost position, disengaging its L-shaped head portion 38a from the cam 35 to free the clamp rod 14. Next, one fore end 36b of the rotating/pull-down bar 36, which opposes the cam 34, is abutted against the latter to turn same counterclockwise. When the cam 34 is turned through a 90-degree angle, its further rotation is blocked by engagement in the recess 36a of the U-shaped bar 36, and the clamp rod 14 is rotated through a 90 degree angle together with the cam 34, integrally connecting the rod to the mold 6 by engaging its head portion 14a crosswise in the locking groove 13 of the mold 6. As the bar 36 is further advanced, the tapered portions 37 on its bottom surface ride on and push down the tapered portions 33 of the disk 32 which has been turned through a 90 degree angle by rotation of the cam 34. As a result, the clamp rod 14 is pushed down to clamp the mold to the platen 3 with the propelling force of the fluid pressure of the drive cylinder 21. In order to release the mold 6, the piston rod 21a of the drive cylinder 21 is retracted, firstly receding the rod rotating/pulling bar 36 from the cam 34 in the recess 36a and the disk 32 below to disengage the tapered portions 33 and 37 from each other. Then the return bar 38 at the lower level is retracted, turning the fore end 38c of the head portion 38 through a 90 degree angle to push and turn the cam 35 which is in the position of FIG. 9. As a result, the clamp rod 14 is turned clockwise by a 90 degree angle, returning the cam 35 and bar 38 to the positions of FIG. 9. The head portion 14a of the clamp rod 14 is again disposed parallel with the rod receptacle hole 13 of the mold 6, and the cam portion 6 is released.

As compared with the rack and pinion mechanism, this arrangement is more simplified in construction as well as in operation, providing a positive selflocking effect in cooperation with the spring 31 in the same manner as described hereinbefore. As is clear from this embodiment, the mechanism for 90 degree rotation and pulldown of the clamp rod 14 has great freedom of design.

Although the mold clamp mechanism of the invention is applied to a lower mold 6 in the foregoing embodiments, it can be similarly applied to an upper mold. Namely, as is well known in the art, the upper mold 40 to be closed on the lower mold 6 as shown in FIGS. 1 and 2 is fixed by bolts to the lower side of an upper platen 42 in a top platen 41 which is supported on the tire press frame 1 so as to be vertically movable or also rotatable. The combination of the rod receptacle hole 13 in the bottom surface of mold and a clamp rod 14 which is lockable in the receptacle hole, according to the invention, can be easily applied to an upper mold as exemplified in FIGS. 13 and 14.

Figure 13:
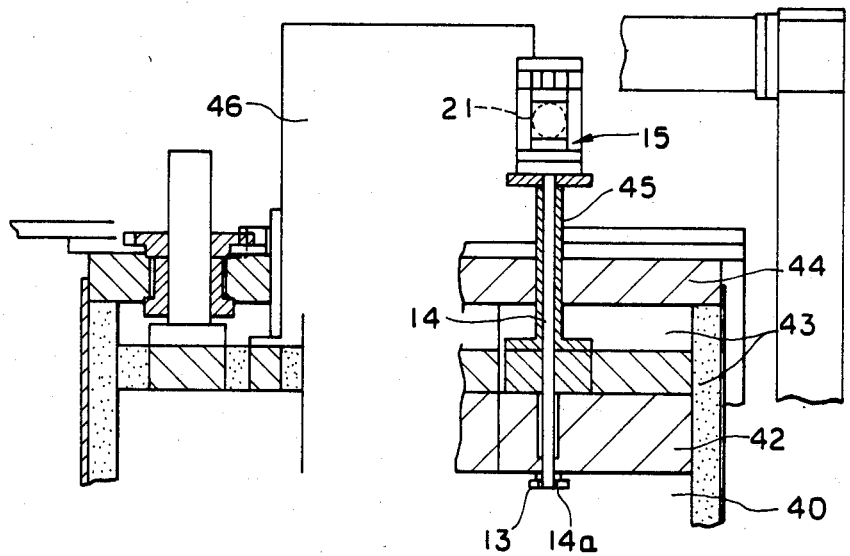
FIG. 13 is a partly sectioned front view of the clamp mechanism of the invention and an upper mold.
Figure 14:
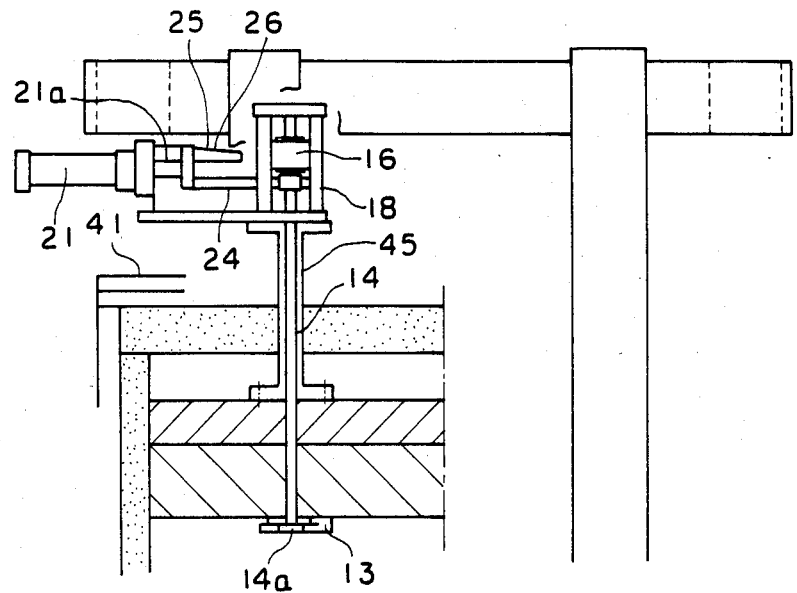
FIG. 14 is a partly sectioned side view of the clamp mechanism and upper mold of FIG. 13.

In FIGS. 13 and 14, there is shown an example using an upper mold clamp mechanism which is same as the first embodiment of FIGS. 1 to 8 except slight differences as will be described hereinbelow, and like components parts are designated by like reference numerals. An upper platen 42 is supported on a base 44 of a top platen 41 through a heat insulating material 43, and a mounting frame as shown at 18 in FIG. 4 (including its internal structure) is projectingly mounted outward of the base 44 of the top platen 41 by the use of a hollow connecting member 45. A clamp rod 14 which is extended through the connecting member 45 is passed through the platen 41 such that its head portion 14a is constantly protruded from the lower surface of the platen 41. The provision of the connecting member 45 which also serves as a guide for the rod 14 makes it possible to mount the mold 40 on the upper platen 42 irrespective of the mold height which is set by a mold height adjustor 46 in the manner well known in the art, namely, irrespective of the clamp position of the head portion 14a of the clamp rod 14. For clamping the upper mold 40, the top platen 41 is fastened as shown in FIGS. 1 and 2 after mounting the lower mold 6 on the lower platen 3, and the upper platen 42 is joined to the upper side (the bottom surface) of the upper mold 40 by means of the mold height adjustor 46. Next, the drive cylinder 21 with the rack bar 24 and tapered bar 26 is actuated, turning the clamp rod 14 through a 90 degree angle the same in the rod receptacle hole 13 and pull the rod upward to clamp the upper mold 40 to the lower side of the upper platen 42. In this case, a drive cylinder 15 may be employed in combination with the above-described mechanism to retract the head portion 14a of the clamp rod 14 completely into a form on the lower surface of the upper platen 42 to prevent damage of the clamp rod which might be otherwise caused when mounting or dismantling the mold for replacement or when positioning the mold at the press center, and the same applies to the embodiment shown in FIGS. 9 to 12.

Figure 16:
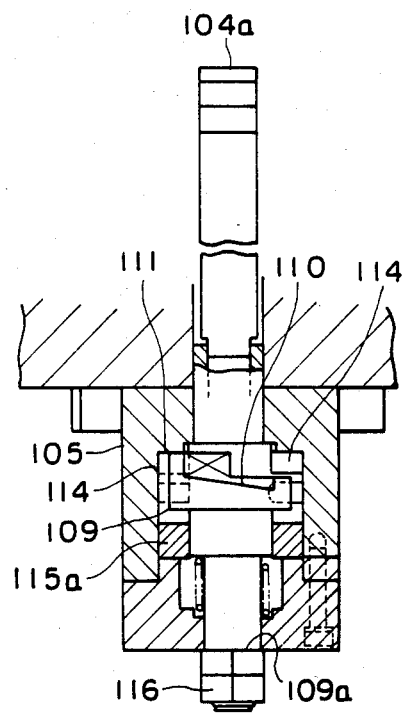
FIG. 16 is a sectioned side view of the clamp mechanism of FIG. 15 in a rod lifted position.

Shown in FIGS. 15 and 16 is a further embodiment employing fully retractable clamp rods 102. The lower end of each clamp rod 102 is directly connected to a piston rod 107a of a rod lifting fluid cylinder 107 for vertical movement. The clamp rod 102 is movable free of a clamp cam block 109 when it is lifted so as to protrude its head portion 102a into a locking groove 103a of a rod receptacle hole 103. In order to rotate the clamp rod 102 with the clamp cam block 109 through a 90 degree angle in the upper lifted position, such is divided into a lower rod section 102b which is connected to the piston rod 107a, and an upper rod section 102c which supports the T-shaped head portion 102a, connecting the upper and lower ends of these rod sections 102b and 102c through joint portions 117 and 118 for interlocked vertical and rotational movements. On the other hand, the clamp cam block 109 is provided with a joint portion 119 for rotating the joint portion of the lower rod section 102c therewith. The clamp cam block 109 is provided with a stepped stopper portion 120 in its upper portion in abutting engagement with an oppoosing stopper portion 121 on a fixed mold support 105 to prevent draw-off of the cam on the upper side, and has its lower end 109a downwardly movably fitted in a hole 22 in a bottom portion of a fixed support frame 105 to permit transmission of a downward force to the joint portion 116 of the clamping rob 102. The box-like fixed support 105 accommodates the cam block 109 in the manner as shown in FIG. 18, ensuring safe and secure back-and-force movements of the operating bars 114 and 115 and the cam operations by its inner side surfaces while serving to protect major operating components. In the case where the head receptacle recess in the mold mounting surface 104 is formed in the same shape as the head portion 102a of the clamp rod 102, such has an interlocking effect when the clamp rod 102 is in the lowered position, blocking operation of the drive cylinder 113 of the clamp cam 109.

As is clear from the foregoing description, the automatic mold clamp mechanism of the present invention can securely and reliably clamp the upper and lower molds to upper and lower platens of a tire press in an extremely simplified manner as compared with conventional counterparts. Namely, according to the invention, a plurality of rod receptacle holes 13 are provided around the press centers of upper and lower molds to receive head portions of clamp rods 14 which are fitted opposingly in the base of the tire press or fixed support members for platens, each clamp rod being operated by a single drive cylinder in turning the clamp rod through a 90 degree angle into interlocked engagement with the corresponding rod receptacle hole in the mold and pulling the clamp rod toward the platen. Accordingly, there is no need for providing complicate rod operating structures or mechanisms around the circumference of a platen as in conventional tire presses. That is to say, the compact clamp mechanism of the invention can be located in the spaces below the bed or on the top platen of a tire press without impairing the structural strength of the molds and platens, and is capable of clamping and releasing the molds in an extremely facilitated manner. The simplicity of the mechanism further has a number of advantages such as ease of maintenance and service, speed-up of the rod rotating and pulling operations, and safe operations in a hot working enviroment, thus contributing to improvement of the productivity and to shortening of the press cycle. In addition, such has a self-blocking function for safety in the event the drive cylinder is accidentally depressurized.

Obviously, numerous modifications and variations of the present invention are possible in light of the above teachings. It is therefore to be understood that within the scope of the appended claims, the invention may be practiced otherwise than as specifically described herein.

What is claimed is:

1. A mold clamp mechanism for a tire press, said clamp mechanism comprising:
   a frame;
   a base connected to said frame;
   upper and lower molds mounted on said frame and said base, respectively, wherein said lower mold includes a plurality of rod locking holes and locking grooves formed therein around a press center portion of said lower mold;
   a corresponding plurality of clamp rods movably received in said rod receptacle holes, each of said clamp rods having a head portion protrudable into one of said locking holes in said lower mold and including means for locking said clamp rods in position when said clamp rod is turned so as to lock said head portion in said locking groove;
   a plurality of drive cylinders each having a piston rod respectively connected to one of said clamp rods for respective advancement of said clamp rods;
   a plurality of rod rotating members respectively connected to said clamp rods and which includes means for turning said clamp rods upon movement of said rod rotating members; and
   clamp rod retraction means mounted on said rod rotating members for retracting said clamp rods subsequent to rotation of said clamp rods by said rod rotating members.

2. The mold clamp mechanism of claim 1, wherein said rod locking holes each further comprise an entrance groove of a width permitting passage of said head portion of said clamp rod only when disposed in parallel relation therewith, and a locking groove of a greater width permitting said head portion to turn therein.

3. The mold clamp mechanism of claim 1, wherein said rod rotating members further comprise a rack and pinion respectively mounted on said clamp rod and a rod operating arm.

4. The mold clamp mechanism of claim 1, wherein said clamp rod retraction means further comprises a retraction member having a tapered cam surface engageable with said clamp rod.

5. The mold clamp mechanism of claim 1, wherein said clamp rod includes a cam mounted thereon and wherein rod rotating members further comprise a cam actuator for engaging said cam.

6. The mold clamp mechanism of claim 1, further comprising a second drive cylinder for vertically lifting and lowering said clamp rod and a carriage for loading and unloading one of said upper and lower molds to and from a position on said mold support structure.

7. The mold clamp mechanism of claim 6, further comprising a rod receptacle recess formed on a mold mounting surface of said mold support structure wherein said head portion of said clamp rod is fully retractable into said rod receptacle recess when said clamp rod is lowered to a bottom position.

* * * * *